United States Patent
Guchhait et al.

(10) Patent No.: US 12,003,433 B2
(45) Date of Patent: Jun. 4, 2024

(54) INTERFACING 2G AND 3G CELLULAR RADIO COMMUNICATION SYSTEMS TO A PACKET-BASED eCPRI/RoE/O-RAN COMPLIANT FRONT HAUL INTERFACE

(71) Applicant: Mavenir Systems, Inc., Richardson, TX (US)

(72) Inventors: Atanu Guchhait, Solna (SE); Prashant Kapoor, Stittsville (CA); Charles Santhosam Lourdu Raja, Bangalore (IN); Nibedita Nandan, Kolkata (IN)

(73) Assignee: Mavenir Systems, Inc., Richardson, TX (US)

( * ) Notice: Subject to any disclaimer, the term of this patent is extended or adjusted under 35 U.S.C. 154(b) by 15 days.

(21) Appl. No.: 17/731,449

(22) Filed: Apr. 28, 2022

(65) Prior Publication Data

US 2022/0353027 A1     Nov. 3, 2022

(30) Foreign Application Priority Data

May 3, 2021   (IN) .............................. 202121020230

(51) Int. Cl.
   *H04B 1/00*     (2006.01)
   *H04B 1/7136*   (2011.01)
   *H04L 5/00*     (2006.01)

(52) U.S. Cl.
   CPC ......... *H04L 5/0023* (2013.01); *H04B 1/7136* (2013.01); *H04L 5/0092* (2013.01)

(58) Field of Classification Search
   CPC . H04W 16/14; H04W 72/0446; H04W 24/02; H04W 72/0453; G01S 7/021; G06N 20/00; H04B 7/024; H04B 7/0413; H04B 7/0617; H04L 5/0035
   USPC ......................................................... 375/132
   See application file for complete search history.

(56) References Cited

U.S. PATENT DOCUMENTS

| | | | |
|---|---|---|---|
| 11,483,776 B1 * | 10/2022 | Wang | ..................... H04W 52/30 |
| 2020/0128414 A1 | 4/2020 | Mishra et al. | |
| 2021/0045193 A1 | 2/2021 | Mishra et al. | |
| 2021/0175960 A1 * | 6/2021 | Hall | ........................ H05B 47/19 |
| 2021/0258988 A1 * | 8/2021 | Balakrishnan | ........... G06N 3/08 |
| 2021/0335354 A1 * | 10/2021 | Park | ..................... G10L 15/063 |
| 2022/0159525 A1 * | 5/2022 | Chou | ..................... H04W 24/02 |
| 2022/0295309 A1 * | 9/2022 | Akhtar | .................. H04W 64/00 |
| 2022/0322380 A1 * | 10/2022 | Ye | .......................... H04L 5/0069 |
| 2023/0014537 A1 * | 1/2023 | Berg | ..................... H04B 7/024 |

OTHER PUBLICATIONS

Extended European Search Report for corresponding European patent application EP22171162.5, 8 pages, dated Sep. 29, 2022.
Umesh et al. "Overview of O-RAN Fronthaul Specifications (Special Articles on Standardization TrendsToward Open en Intelligent Radio Access Networks" NTT Docomo Technical Juornal vol. 21, No. 1, Apr. 1, 2019 pp. 46-59.

* cited by examiner

*Primary Examiner* — Khai Tran
(74) *Attorney, Agent, or Firm* — Ruggiero McAllister & McMahon LLC

(57) ABSTRACT

There is provided, an open radio access network distributed unit (O-DU) having an electronic module that performs an FS-8 Radio Access Technology (RAT) functionality such as frequency hopping, downlink (DL) carrier aggregation, uplink (UL) channelization, power control, and fast automatic gain control (AGC).

13 Claims, 9 Drawing Sheets

INTERFACING 2G AND 3G CELLULAR RADIO COMMUNICATION SYSTEMS TO A PACKET-BASED eCPRI/RoE/O-RAN COMPLIANT FRONT HAUL INTERFACE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

1. Field of the Disclosure

The present document is directed to a system for functional split-8 (FS-8) Radio Access Technologies (RATs), referred to herein as FS-8 RAT, e.g., second generation (2G) and third generation (3G), to generate/receive Open Radio Access Network (O-RAN) fronthaul (FH) compatible In-phase/Quadrature-phase (IQ) data to/from O-RAN framer/deframer functions, downlink (DL) and uplink (UL) respectively, in an open distributed unit (O-DU). The acronyms O-DU and DU are used herein, interchangeably. For references to an Open RAN Radio Unit, the acronyms O-RU and RU are used herein, interchangeably.

2. Description of the Related Art

The approaches described in this section are approaches that could be pursued, but not necessarily approaches that have been previously conceived or pursued. Therefore, the approaches described in this section may not be prior art to the claims in this application and are not admitted to be prior art by inclusion in this section.

The present document, near its end, includes a list of acronyms and a list of definitions.

Open Radio Access Network (O-RAN) standard has gained huge attention from wireless infrastructure manufacturers and operators across the globe. O-RAN fronthaul (FH) specification allows interoperability and standardization of RAN components primarily Open Distributed Unit (O-DU) and Open Radio Unit (O-RU) using a unified interconnection standard over a packet-based transport interface such as Enhanced Common Public Radio Interface (eCPRI) and Radio over Ethernet (RoE). This has enabled seamless integration of white-box hardware and open-source software elements from different component vendors for O-DUs and O-RUs.

O-RAN standard in its current specification supports only 4G and 5G radio access technologies (RAT) through functional split 7.2× (FS-7.2×) interconnect where frequency domain data IQ samples, beamforming weights and related control, management and synchronization information are carried over a fronthaul interface (FH). This allowed FS-7.2× RAT base-station systems to be designed and deployed more flexibly, cost effectively and efficiently, thus reducing system CAPEX and OPEX significantly.

O-RAN standard in its current specification coverage, version 6 and below, does not support front-haul transport for FS-8 RATs. By extending the support for FS-8 RATs transport over FH, enhanced O-RAN standard will enable true multi-RAT deployment in the field when augmented with appropriate interface solutions to the FS-8 RAT access units namely to the existing Base transceiver station (BTS) for 2G and Node-B for 3G.

SUMMARY OF THE DISCLOSURE

While efforts for functional enhancements to the O-RAN standard are underway to support FS-8 RATs, e.g., 2G and 3G, along with FS-7.2× RATs, one of the feasible approaches is O-RAN FH interfaces to FS-8 RATs to carry time domain IQ samples over the FH without impacting the existing access network operations.

The present document provides a system for front-haul functional split-8 (FS-8) RATs to generate/receive O-RAN compatible IQ data to/from O-RAN framer/deframer functions (DL and UL respectively) in O-DU. This allows migration of complex radio functionalities like Frequency Hopping (where applicable), DL carrier aggregation and UL channelization, power control and fast AGC operations to O-DU software (SW), thus reducing FH load for real time control traffic. This migration also enables simpler system design and control.

The specification is mainly focused to RATs with FS-7.2×, e.g., 3GPP LTE and NR. This limitation can be overcome by incorporating enhancements to the O-RAN Control, User and Management plane functions to allow transport of time domain IQ samples and control information from existing 2G BTS and 3G Node-B to the radio unit over the fronthaul. Such enhancements to the standard will extend O-RAN capability to FS-8 RATs. In this innovation context we assume that front-haul transport O-RAN standard is augmented with such enhancements for FS-8 RATs and is capable of carrying time domain IQ samples and control from BTS to O-RU over fronthaul. The system and method presented herein is also applicable to FH interfaces carrying frequency domain IQ with minimal or no modifications.

FS-8 (2G and 3G) RATs do not have any frequency domain processing in their layer-1 functionality specifications. Thus, for unified fronthaul transport, FS-8 RAT systems require additional mandatory functions in both DL and UL in O-DU along with standard mandated layer-1 processing. These additional functions will enable coexistence of FS-8 RATs with FS-7.2× RATs over the fronthaul network.

In addition, this additional processing mentioned in the previous paragraph should not impact existing layer-1 standards in any way and should facilitate reutilization of existing O-RUs (for FS-7.2×) to be shared and reutilized for FS-8 RATs. Hence, the additional processing should enable full flexibility, cost effectiveness and faster rollout of multi-RAT O-RAN networks in the field.

Existing O-RAN fronthaul interfaces do not support transport of FS-8 RAT traffic. Thus FS-8 RATs were transported to/from RU using non-O-RAN FH standards like CPRI or eCPRI.

The present disclosure provides a system in the O-DU for FS-8 RATs while interfacing O-RAN-based fronthaul to carry time domain IQ samples. The system described represents the interfacing functions at O-DU system when FS-8 RAT BTS/Node-B interfaces capable O-RAN framer and deframer functions without impacting the traditional way of generating FS-8 RAT time domain IQ samples. Thus, when implemented at multi-RAT O-DU, O-RAN fronthaul will allow traditional FS-8 RATs (like 2G and 3G) transmissions and reception using O-RAN compliant FH designs. Hence, they will enable support for true multi-RATs (2G, 3G, 4G and 5G NR) operations.

The system disclosed herein will allow 2G and 3G RAT to generate time domain IQ data and control signals. This will be carried in the downlink and uplink directions as per FS-8. Thus, the packet-based FH transport network will significantly extend the ability of the O-RAN based systems.

The system presented herein will allow both independent and simultaneous transport of FS-8 as well as FS-7.2× RATs over the same physical interface. Content of the packets can be determined by the layer-1 standards without limiting the FH capability or radio operation capabilities.

The system, in addition, will allow migration of multiple complex RU functions, such as frequency hopping (only for 2G), Fast AGC, RU Power Control, Carrier aggregation, channelization to the O-DU. Thus, can be easily designed and controlled from centralized SW processing in the O-DU. Hence will allow greater infallibility and ease of radio control and management.

The system will allow reuse of FS-7.2× O-RU for FS-8 operation with no changes, or minimal changes in the O-RU SW and firmware (FW).

There is thus provided, an O-DU having an electronic module that performs an FS-8 RAT functionality such as frequency hopping, DL carrier aggregation, uplink UL channelization, power control, and fast AGC.

DESCRIPTION OF THE DISCLOSURE

The system disclosed herein will allow FS-8 RATs (2G and 3G) to interface to O-RAN FH, and in general, any packet-based FH transport network standard.

Figure 1:
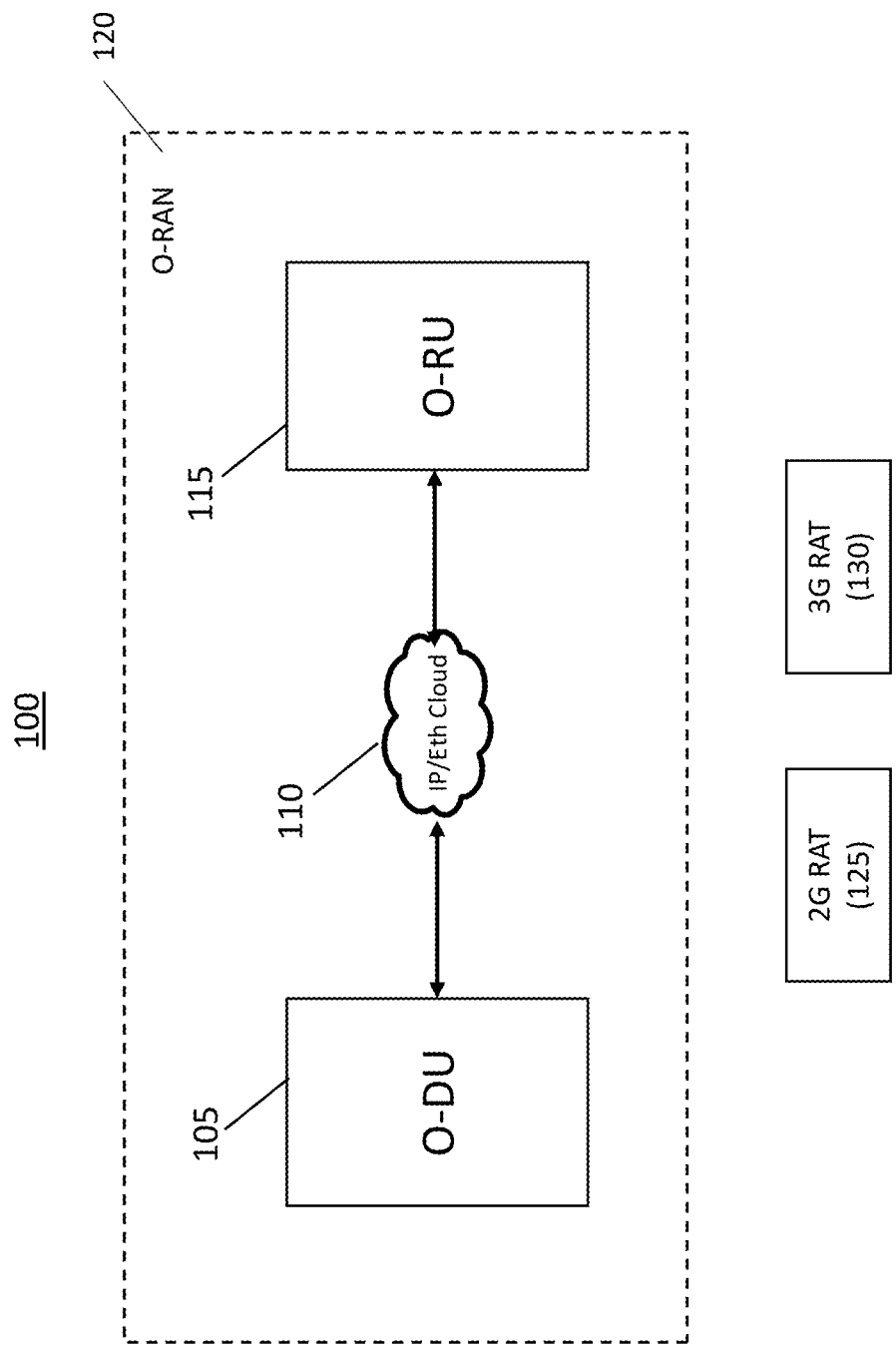
FIG. 1 is a block diagram of a system of a single RAT radio access solution where an O-DU communicates with an O-RU over an O-RAN FH in an O-RAN.

FIG. 1 is a block diagram of a system 100 of a single RAT radio access solution where an O-DU 105 communicates with an O-RU 115 over an O-RAN FH 110 in an O-RAN 120. System 100 includes a 2G RAT 125 and a 3G RAT 130, which, in practice, are connected directly to O-DU 105.

System 100 can be configured to map the 2G signal to the any LTE bandwidth equivalent analog stream such as 5/10/15/20 MHz. Thus, system 100 allows an available 2G spectrum to be split across different antennas in multiples of LTE-equivalent bandwidths by using different RF frequencies for each of the antenna.

Figure 2:
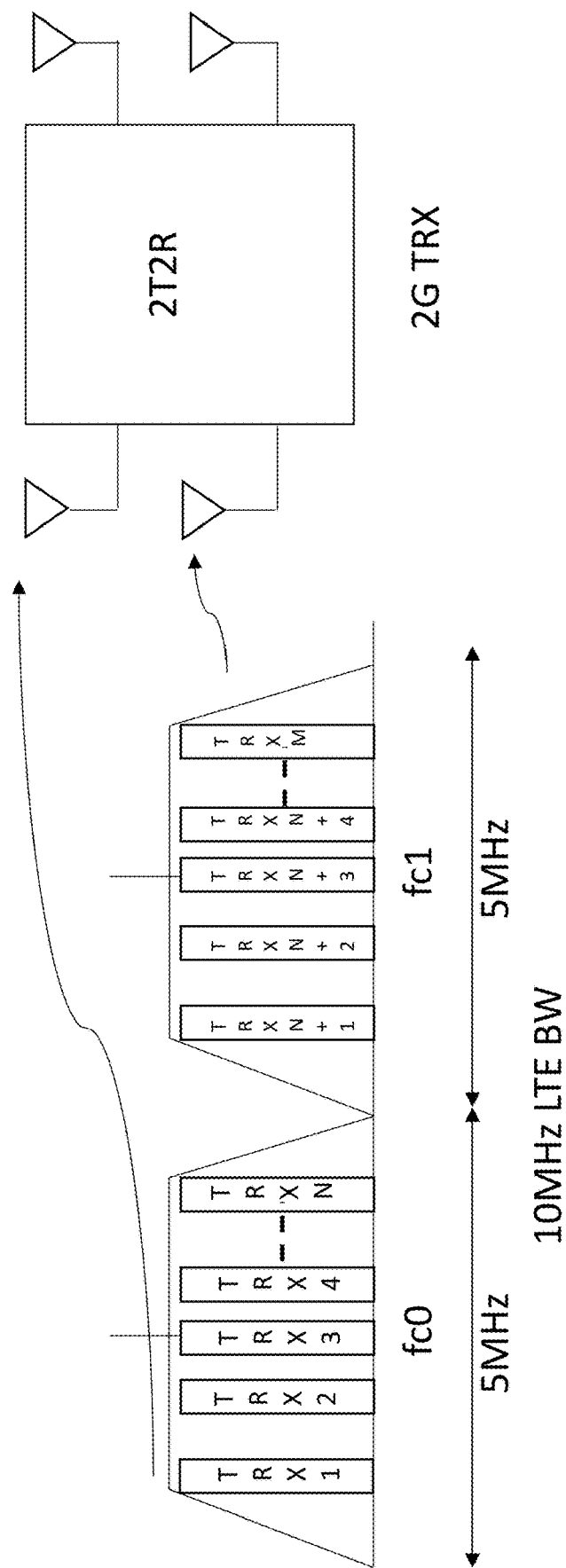
FIG. 2 shows an example in which, in the system of FIG. 1, to cover 10 megahertz (MHz) of multicarrier GSM requirement, a 2T2R radio is configured with 5 MHz in each antenna, but with different carrier frequencies.

FIG. 2 shows an example in which, in system 100, to cover 10 MHz of LTE bandwidth (BW) by multicarrier GSM spectrum, a 2T2R radio, e.g., 2G RAT 125, is configured with 5 MHz in each antenna, but with different carrier frequencies.

Figure 3A:
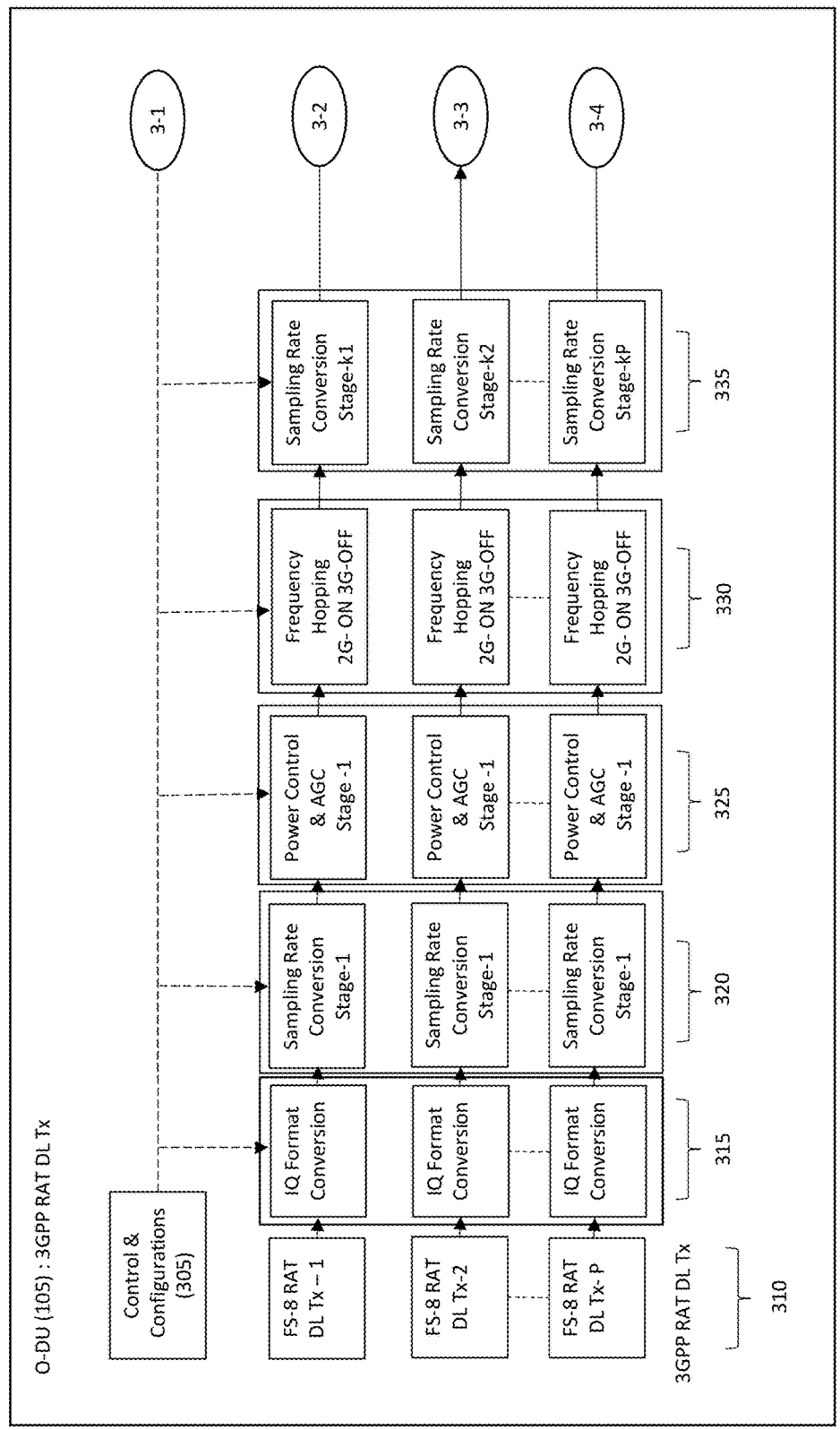
FIGS. 3A and 3B, together, are a block diagram of a DL architecture.
Figure 4A:
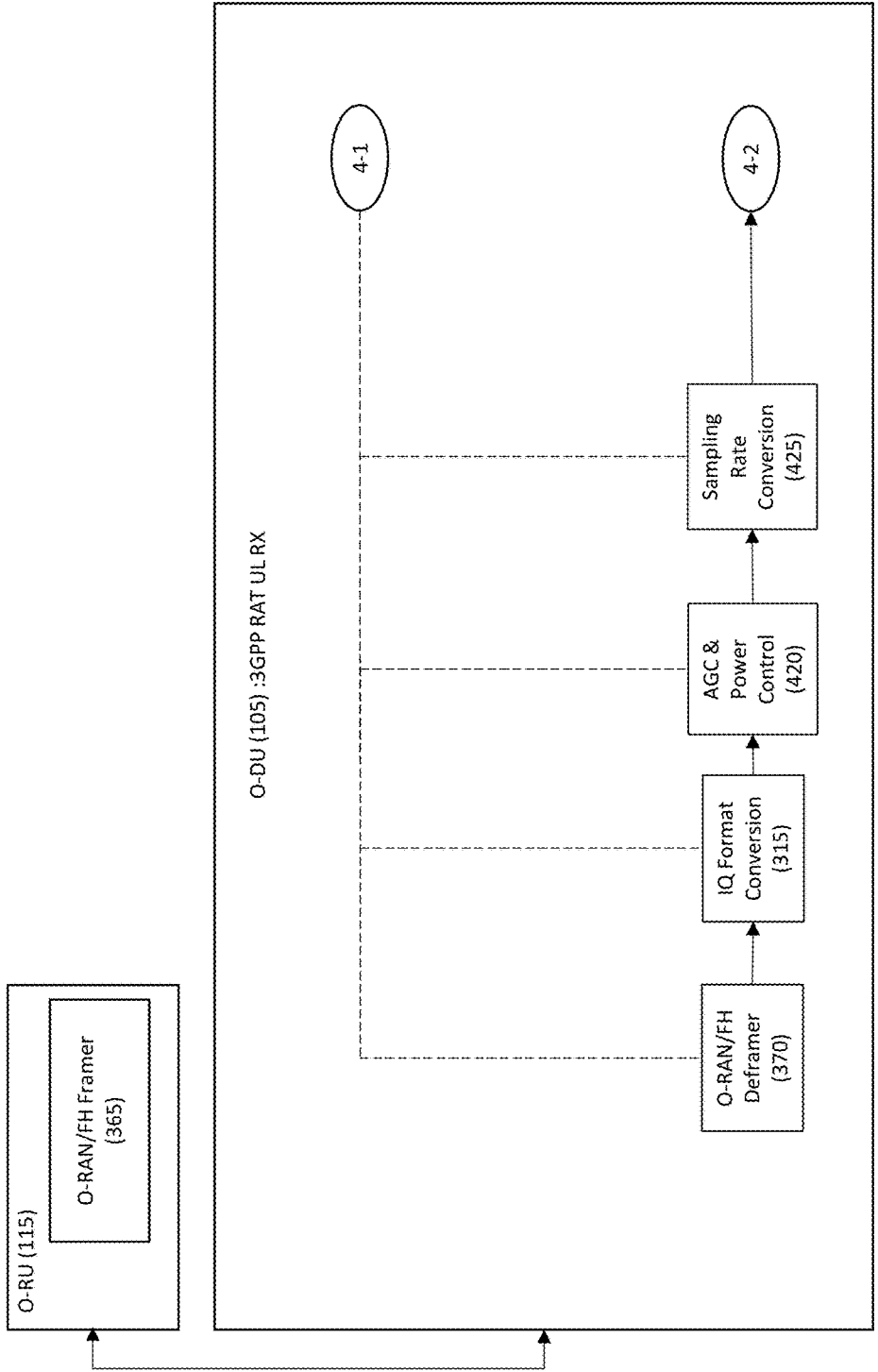
FIGS. 4A and 4B, together, are a block diagram of a UL architecture.

System architectures for DL and UL paths, implemented at O-DU 105, are described in FIGS. 3A/3B and FIGS. 4A/4B respectively.

Figure 3B:
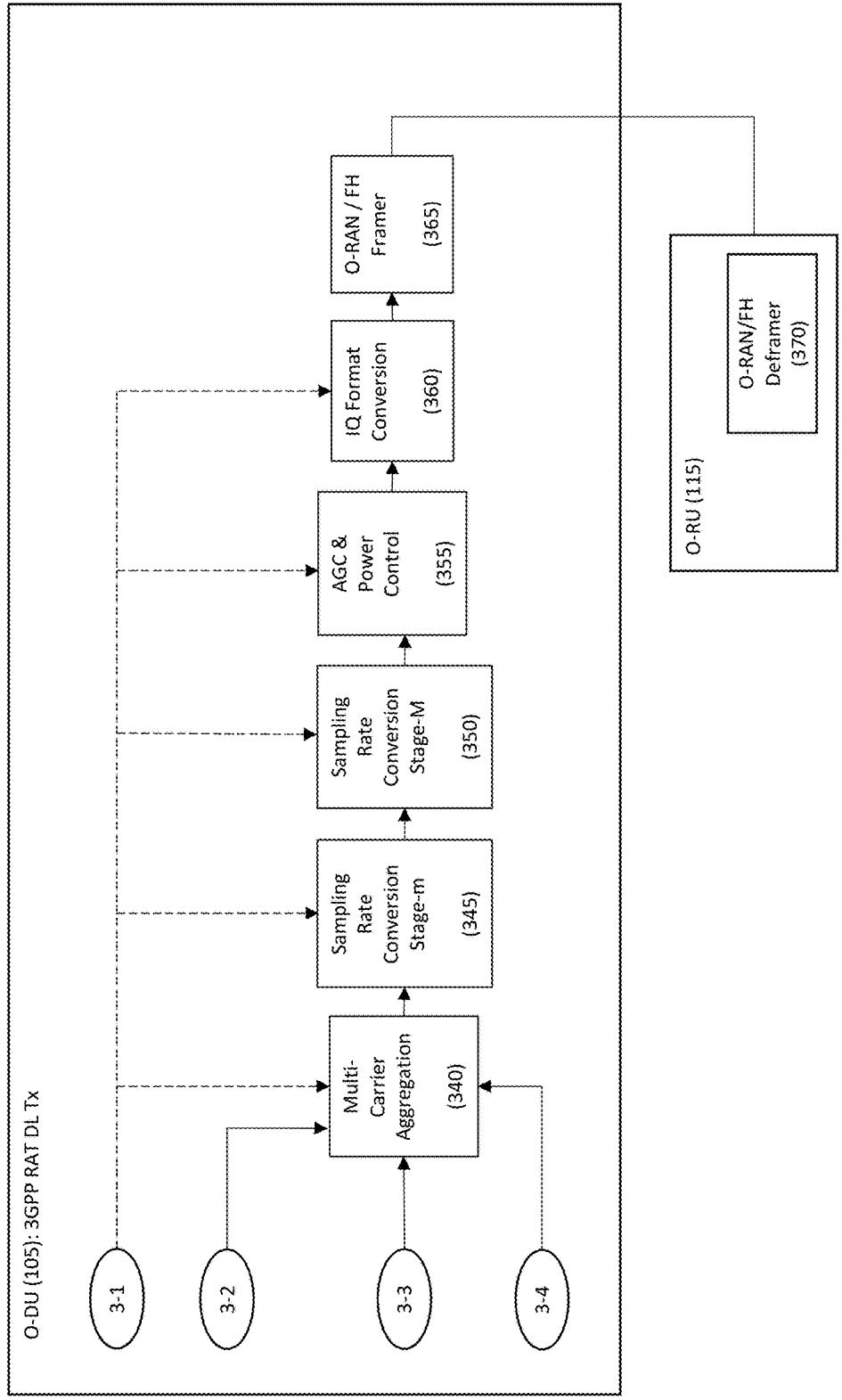

FIGS. 3A and 3B, together, are a block diagram of a DL architecture 300 that is applicable to both 2G RAT 125 and 3G RAT 130 unless explicitly indicated. Lines between FIGS. 3A and 3B are connected via connecting bubbles 3-1, 3-2, 3-3 and 3-4, and FIGS. 3A and 3B are collectively referred to herein as FIG. 3.

DL architecture 300 includes O-DU 105 and O-RU 115.

In DL architecture 300, O-DU 105 includes:
i. I/Q format conversion modules 315
ii. DL sample rate converter module [K Msps to N*3.84 Msps (K—input sampling rate in Msps, N is an integer, N=1, 2, 3, ...)]
  1. Option 1: Sample Rate conversion module single Stage 320
  2. Option 2: Sample Rate Conversion module multiple stage 335
iii. DL Frequency Hopping Module 330
  1. ON only for 2G RAT
  2. OFF for 3G RAT
iv. Carrier Aggregation Module 340 (for Multicarrier Signal Generation)
v. Power Control & AGC Function Module 325 (combined and component carrier wise)

In DL architecture 300, O-DU 105 also includes control and configurations 305, FS-8 RATs 310, a sampling rate conversion stage-m 345, a sampling rate conversion stage-M 350, AGC and power control 355, an IQ format conversion 360, and an O-RAN/FH framer 365.

FIGS. 3A/3B show the scalable DL path processing system and architecture which is applicable to both 2G and 3G RATs. This provides a DL path architecture for multiple FS-8 RATs (2G and 3G) Interfacing O-RAN (packet Based) FH framer function in the transmission path. Frequency hopping function is ON for 2G and OFF for 3G RAT. These interfacing functions indicated here are implemented in O-DU 105. These functions will enable standard FS-8 to interface FH framer function in O-DU 105 DL path. Operational steps are:

1. Standard FS-8 RAN 310 BTS/Node-B functions will produce DL IQ samples with predefined sampling rates (as specified in the respective 3GPP standards).

2. A control and configuration function 305 is provided to flexibly configure operations of each stage indicated in FIG. 3A. This can also configure operation stages and their order as necessary for individual RATs.

3. Multiple such multi standard or single standard RAT base station (BS) functions are interfaced to create the target multi-carrier multi-RAT output that will be carried to O-RU over O-RAN FH interface.

4. IQ samples generated from each RAT are passed through the following functions in combination to generate frequency hopped, gain adjusted IQ streams and given input to the Multi-carrier aggregator function input.
  a) Rate conversion stages 320/335
  b) Frequency hopping (ON for 2G, OFF for 3G) 330
  c) Power Control & Automatic Gain Control (Slow/Fast AGC) 325

5. Multicarrier aggregator 340 aggregates IQ samples from multiple carriers' streams (from same or different RATs) and produces a combined IQ stream over target bandwidth (BW)

and center baseband frequency. Numerically controlled Oscillators (NCOs) are used judiciously to create such aggregated signal.

6. Further Sampling rate conversion stages 345/350 are applied to the aggregated signal to reach target sampling rate of the FH interface.

7. Additional AGC and power control 355 may be applied on the combined multi-RAT multi-carrier IQ stream to reach target power and gain level.

8. Finally, IQ format conversion 360 is applied to match the format supported by the FH interface standard.

9. O-RAN/FH framer 365 puts the necessary header and makes the format compatible to be transferred to O-RU 115. The output of O-RAN/FH framer 365 is a composite signal, as it has many carrier components and many other conversion operations.

When this composite signal, from O-RAN/FH framer 365, reaches O-RU 115, target wideband FS-7.2× O-RU can treat this as a wideband multi-RAT multi-carrier composite signal and can bypass any FS-7.2×-specific processing, and present it to a standard RF path for transmission, thus, enabling standard FS-7.2× O-RU to serve FS-8 RATs. In another approach, inside O-RU 115, there can be a separate processing path for handing FS-8 RATs operation.

In DL architecture 300, O-RU 115 includes an O-RAN/FH deframer 370.

Figure 4B:
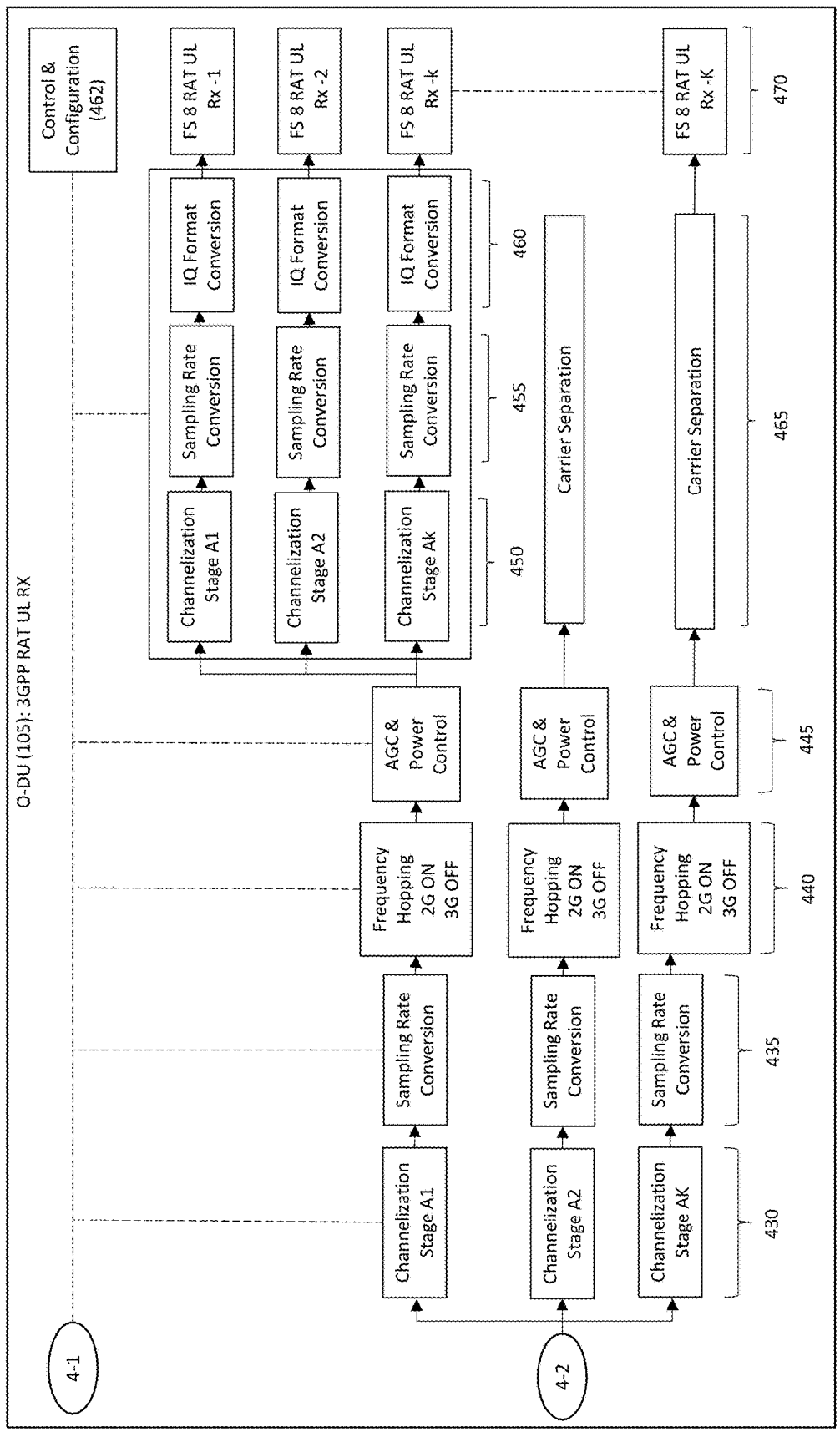

FIGS. 4A and 4B, together, are a block diagram of a UL architecture 400 that is applicable to both 2G RAT 125 and 3G RAT 130 unless explicitly indicated. Lines between FIGS. 4A and 4B are connected via connecting bubbles 4-1 and 4-2, and FIGS. 4A and 4B are collectively referred to herein as FIG. 4.

UL architecture 400 includes O-RU 115 and O-DU 105.

In UL architecture 400, O-RU 115 includes an O-RAN/FH framer 365.

In UL architecture 400, O-DU 105 includes:

i. I/Q format conversion modules 315 ii. UL Multistage channelizer Module (to select a set of component carriers) 430 iii. UL sample rate converters [from N*3.84 Msps to K Msps (K—input sampling rate in Msps, N is an integer, N=1, 2, 3, . . . )]
  1. Option 1: Single stage Sample Rate conversion 435
  2. Option 2: Sample Rate Conversion in multiple stages 455 iv. UL Frequency Hopping function/Module 440
  1. ON only for 2G RAT
  2. OFF for 3G RAT v. Carrier Separation Module 465, which is a collective representation of several modules, namely channelization module 450, sampling rate conversion module 455, and IQ format conversion module 460. This module separates the signal centered on a different carrier and does the signal processing to make the signal ready to feed at each FS-8 RAT 470 module.

vi. AGC & Power Control Module 445

In architecture 400, O-DU 105 also includes an AGC & Power Control 420, and a Sampling Rate Conversion 425.

Unified architecture for 2G RAT 125 and 3G RAT 130 for DL and UL processing (at O-DU 105) to interface packet-based enhanced O-RAN fronthaul transport protocol. This is called unified architecture because same architecture can be used for both 2G and 3G RATs.

a. Unified architecture for joint sample rate conversion 320, frequency hopping 330, AGC and power control 325 and multicarrier signal generation 340 in DL.

i. DL Frequency Hopping Module 330
  1. ON for 2G RAT
  2. OFF for 3G RAT b. Unified UL architecture for joint channelization 430, sample rate conversion 435, frequency hopping 440, AGC and power control 445 and carrier signal separation 465.

i. UL Frequency Hopping Module 440
  1. ON for 2G RAT
  2. OFF for 3G RAT

These architectures as presented in FIG. 3 and FIG. 4 enable coexistence of FS-8 and FS-7.2× RATs in the same packet-based FH interface network as O-RAN.

System architectures for DL and UL paths (implemented at O-DU 105 implementing FS-8 RATs 2G RAT 125 and 3G RAT 130).

FIG. 4 shows the scalable, i.e., can be implemented for K number of carriers, UL path processing system and architecture applicable to both 2G RAT 125 and 3G RAT 130. The UL path architecture for FS-8 interfacing O-RAN (packet-based) consists of O-RAN/FH framer 365 and O-RAN/FH deframer 370. From channelization to IQ Format conversion indicated here are implemented in O-DU 115 in the UL path after O-RAN/FH deframer 370. These functions will enable standard FS-8 RAT BS to interface O-RAN/FH deframer 370 in O-DU UL path. Operational steps are following:

1. Standard FS-8 RAN BS functions will receive composite UL IQ samples with predefined sampling rates (as specified in the respective 3GPP standards). Goal of the following steps is to channelize (separate each component carrier of the RAT), each constituent component carriers IQ samples and provide to the traditional FS-8 RAT BTS or Node-B functions in O-DU.

2. A control and configuration function 462 flexibly configures operations of each stage indicated in UL architecture 400. This can also configure the operations stages and their order for individual RATs.

3. Multi-RAT multi standard composite IQ stream is interfaced to this architecture to create the target multi-carrier multi-RAT outputs (each IQ stream belongs to constituent component carrier of the respective RAT) that will be carried to respective BTS/Node-B functionality of the participating FS-8 RAT. This composite IQ samples steam occupies target BW and has component carriers in the frequency domain.

4. Composite IQ samples generated by O-RAN/FH deframer 370 is passed through AGC and power control 420 and rate conversion function stages (425) (optional) in combination to generate gain adjusted IQ streams and given input to the first set of channelization stages 430. These channelization stages have the capability to segregate multiple component carrier chunks for further processing in the UL direction. Each can have component carriers from same or different FS-8 RATs.

5. Multicarrier channelization stages generate IQ samples having fewer component carriers. These IQ streams are passed through the respective carrier separation blocks 465 to generate individual IQ streams for each FS-8 RAT component carrier. Functions of carrier separation blocks 465 include another channelization function 450, sample rate conversion stages 455, and then lastly IQ format conversion 460 to interface the UL RAT receivers.

6. The operations in carrier separation block 465 are pre-configured and sequenced by control and configuration block 462 as per the predefined logic in the system.

7. Additional AGC and power control functions 445 may be applied in the carrier separation block in combination with a channelization function 450 to the segregated component carrier signal to reach target power and gain level.

Thus, system 100 is implemented with channelization stages in O-DU 105 in software for further processing in the UL direction to achieve multiple transmit-receive chain (TRX) per antenna. Each can have component carriers from same or different FS-8 RATs.

When each channelized component signal reaches the respective UL BTS or Node-B processing functions, they process them as per the 3GPP layer-1 specifications.

DL architecture 300 and UL architecture 400 also include compliance to DL spectral emission mask and UL blocker requirements, respectively. The Spectral Emission Mask compliances are achieved by the combined operations of Sampling rate conversion function stages in the DL architecture 300. In the UL architecture 400, blocker compliance is achieved by combined operations of sampling rate converter stages 435/455 and channelizer function stages 430/450.

DL architecture 300 and UL architecture 400 are also unified IQ path processing architectures for joint sample rate conversion, frequency hopping (only for 2G), AGC, power control and multicarrier signal generation in DL at O-DU (implementing FS-8 RATs).

Figure 5:
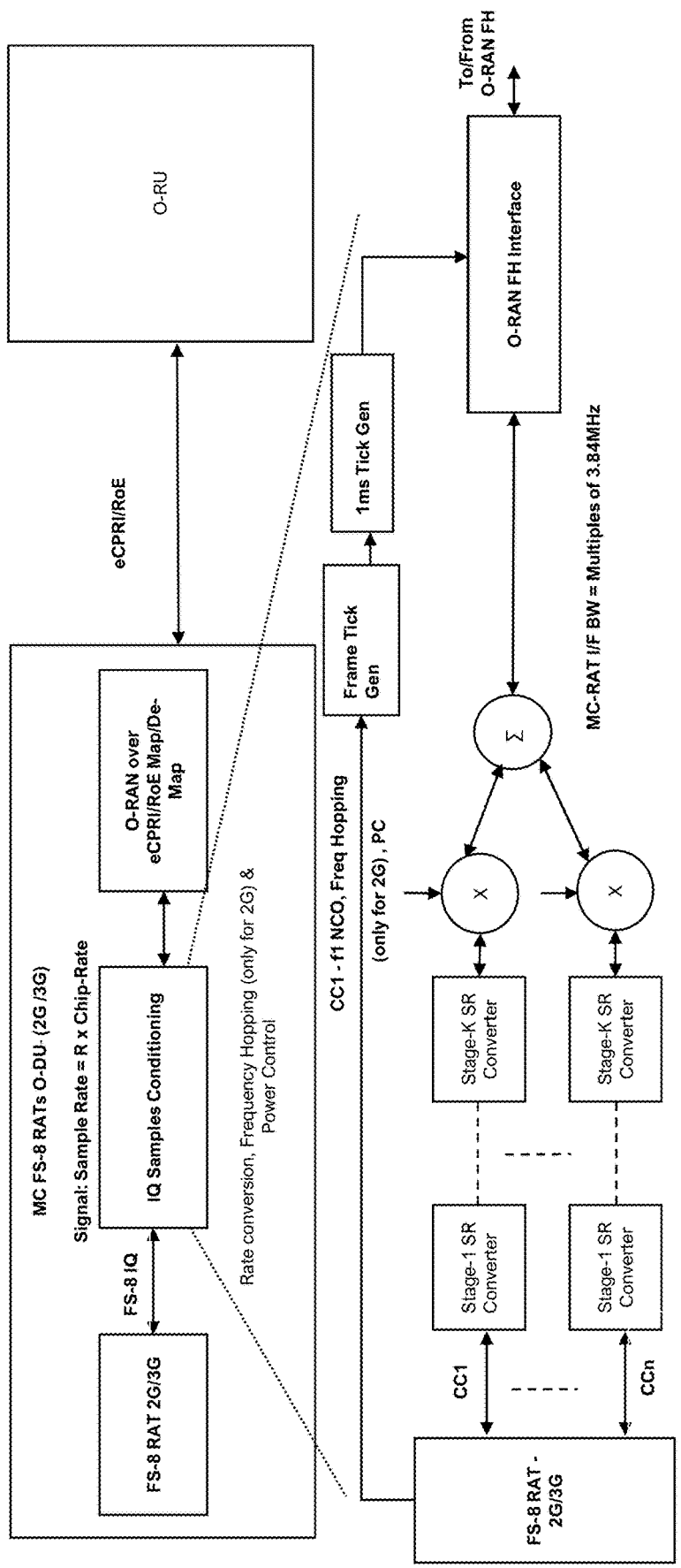
FIG. 5 is a block diagram of O-DU processing for FS-8 RAT to support frequency hopping and power control features in an O-DU and interface to an O-RAN compliant FH interface.

FIG. 5 is a block diagram of O-DU processing for FS-8 RAT to support frequency hopping and power control (PC) features in an O-DU and interface to an O-RAN compliant FH. FIG. 5 shows a joint frequency hopping (ON for 2G, OFF for 3G) and power control structure for FS-8 RATs system along with the sample rate conversions needed to carry IQ data over an O-RAN interface. A frequency offset for each target carrier and power/gain control can be applied to a specific carrier independently as shown in the RAT processing path in FIG. 5. Note that frequency hopping pattern is only applicable to 2G RAT. For 3G, the frequency hopping function is switched off.

A composite Multi-Carrier (MC) FS-8 signal is made from the constituent RAT component carriers following the signal processing structure (shown in FIG. 5). Multistage rate conversion filters ensure DL spectral emission mask specification compliance for each component GSM or 3G carriers respectively. Single or multistage NCO and gain multiplication blocks allow the design to meet the DL frequency hopping (for 2G RAT) and power control requirements or AGC requirements for FS-8 RATs. The structure is scalable and flexible, and multiple optimized design variations are possible by varying multiple design parameters. Example design parameters include, but are not limited to, number filter stages, filter BWs, number of NCO stages, NCO gain and frequency values, and channel BW.

Unified UL path architecture for joint channelization, sample rate conversion, frequency hopping (only applicable for 2G), AGC, power control and multicarrier signal generation at O-DU 105 (implementing FS-8 RATs).

The present document in FIG. 4B shows a joint UL component carrier channelizer, frequency hopping (only applicable to 2G RAT) and power control and AGC structure for FS-8 RATs systems along with the sample rate conversions needed over the O-RAN compliant FH carried IQ data. Frequency offset for each target career and power offset can be applied specific carrier as PC and Frequency Hopping pattern input to the processing functions as shown in FIG. 4B in the RAT processing path. Note that frequency hopping pattern is only applicable to 2G RAT. For 3G, the frequency hopping function is switched off.

Figure 6A:
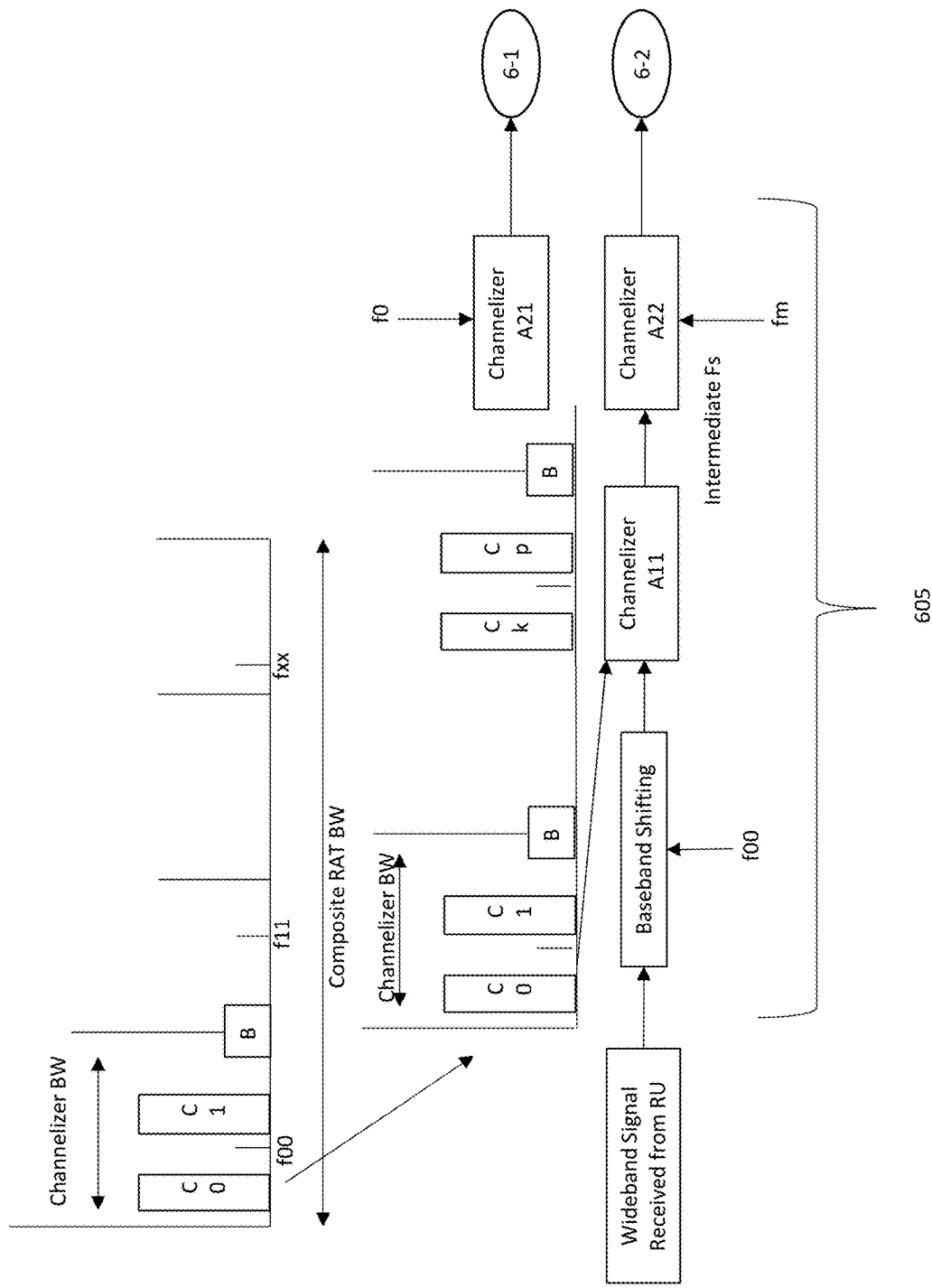
FIGS. 6A and 6B, together, are a block diagram of O-DU UL processing for FS-8 RAT to support UL frequency hopping and power control/fast AGC features in an O-DU and interface to an O-RAN compliant FH interface.
Figure 6B:
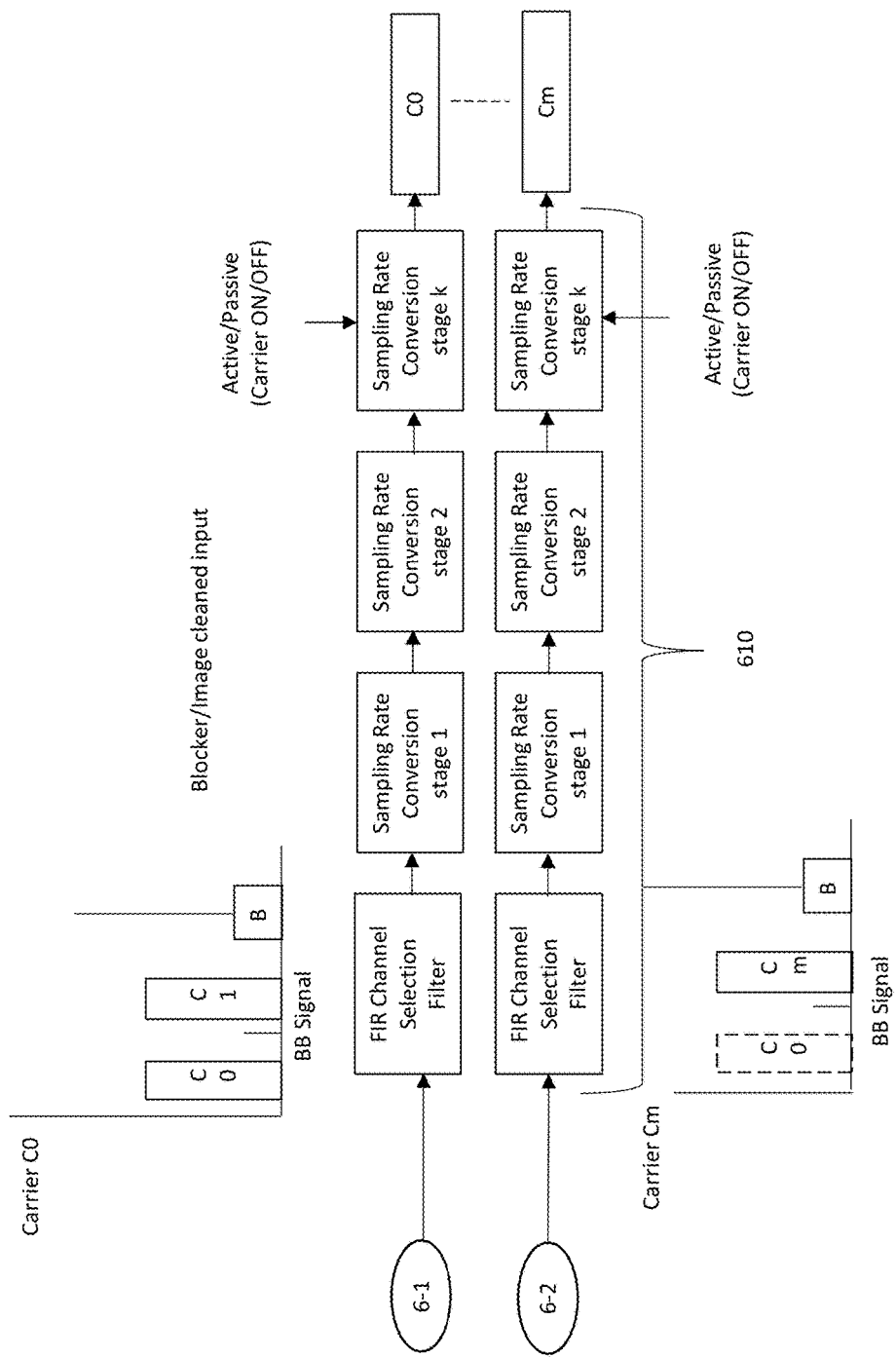

FIGS. 6A and 6B, together, are a block diagram of O-DU 105 UL processing for FS-8 RAT to support UL frequency hopping and power control/fast AGC features in O-DU 105, and interface to an O-RAN compliant FH interface. Lines between FIGS. 6A and 6B are connected via connecting bubbles 6-1 and 6-2, and FIGS. 6A and 6B are collectively referred to herein as FIG. 6.

Such blocks can be repeated for all the specified component carrier center frequencies mentioned as f00 to fxx in FIG. 6A to cover complete composite RAT BW handled by the system.

A composite (coming from different RAT at different center frequency) MC-RAT signal is fed to a signal processing structure 605 (shown in FIG. 6A) and a signal processing structure 610 (shown in FIG. 6B) to decompose the composite MC-RAT signal into constituent component carriers. The multistage rate conversion filters inside signal processing structure 610 are designed to ensure 3GPP UL blocker specification compliance for respective RATs.

Multistage NCO and gain multiplication blocks inside signal processing structure 605 allow system 100 to meet the UL frequency hopping and fast AGC/power control requirement for 2G RAT 125. For 3G frequency hopping feature is switched off. The structure is scalable and flexible across RATs, and multiple optimized design variations are possible by varying multiple design parameters. Example design parameters include, but are not limited to, number filter stages, filter BWs, number of NCO stages, NCO gain and frequency values, channel BW.

System 100 provides for coexistence of FS-8 and FS-7.2 RATs on the same O-DU 105 and O-RU 115 SW/HW. This will allow one DU SW/HW support for RATs coexistence and parallel operations. In addition, common M-plane and S-Plane design shared across multiple RATs will help in better O-RU system coordination and power savings.

On O-DU 105, in software, time domain IQ samples will be transported to O-RU 115 using enhanced O-RAN FH transport mechanisms. This will enable existing 2G BTS or 3G Node-B to interface O-RAN FH without any modification in their existing layer-1 design or implementations. In addition, this interfacing architecture and method will enable migration of existing hardware oriented BTS and Node-B designs towards SW (in cloud) based RAN functions designs hence bring greater design, deployment flexibility in addition to the foreseen management and cost advantages to the operators.

Each of O-DU 105 and O-RU 115 includes electronic circuitry that performs operations to execute methods or processes described herein. The circuity may be implemented with any or all of (a) discrete electronic components, (b) firmware, or (c) a programmable circuit that includes a processor and a memory. Such a processor is an electronic device configured of logic circuitry that responds to and executes instructions. Such a memory is a tangible, non-transitory, computer-readable storage device encoded with a computer program. In this regard, the memory stores data and instructions, i.e., program code, that are readable and executable by the processor for controlling operations of the processor. The memory may be implemented in a random-access memory (RAM), a hard drive, a read only memory (ROM), or a combination thereof.

Additionally, the program code may be configured on a storage device for subsequent loading into the memory. Such a storage device is a tangible, non-transitory, computer-readable storage device, and examples include (a) a compact disk, (b) a magnetic tape, (c) a read only memory, (d) an optical storage medium, (e) a hard drive, (f) a memory unit consisting of multiple parallel hard drives, (g) a universal serial bus (USB) flash drive, (h) a random-access memory, and (i) an electronic storage device coupled the components of system 100 via a network, e.g., the Internet.

The program code may be configured in one or more modules. The term "module" is used herein to denote a functional operation that may be embodied either as a stand-alone component or as an integrated configuration of a plurality of subordinate components. Thus, a module may be implemented as a single module or as a plurality of sub-ordinate modules that operate in cooperation with one another.

The techniques described herein are exemplary, and should not be construed as implying any particular limitation on the present disclosure. Various alternatives, combinations and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The term "comprises" or "comprising" are to be interpreted as specifying the presence of the stated features, integers, operations or components, but not precluding the presence of one or more other features, integers, operations or components or groups thereof. The terms "a" and "an" are indefinite articles, and as such, do not preclude embodiments having pluralities of articles.

ACRONYMS

3GPP: 3rd Generation Partnership Project
AGC: Automatic gain control
BS: Base Station
BTS: Base transceiver station
BW: Bandwidth
C&M: Control and Management
CAPEX: Capital expenditures
CCH: Control channel
CPRI: Common Public Radio Interface
CUS-plane: Control, user, and synchronization plane
DL: Downlink
eCPRI: Enhanced Common Public Radio Interface
eNB: eNodeB (4G LTE base station)
FEC: Forward error correction
FH: Fronthaul
FS: Functional split
FW: Firmware
gNB: gNodeB (5G NR base station)
GPS: Global positioning system
HW: Hardware
IQ: In-phase/Quadrature-phase
LTE: Long-Term Evolution
M-plane: Management plane
NCO: Numerically Controlled Oscillator
O-CU: O-RAN compliant Centralized Unit
O-DU: O-RAN compliant Distributed Unit
O-RAN: Open Radio Access Network
O-RU: O-RAN compliant Radio Unit
OPEX: Operating expenses
PRACH: Physical random-access channel
PRB: Physical resource block
PTP: Precision time protocol
RACH: Random access channel
RAT: Radio access technology
RE: Resource element
RoE: Radio over Ethernet
SMO: Service Management and Orchestration
SW: Software
SyncE: Synchronous Ethernet
TCH: Traffic channel
TRX: Transmit-receive chain
UL: Uplink

Definitions

Channel: the contiguous frequency range between lower and upper frequency limits.
DL: DownLink: data flow towards the radiating antenna (generally on the LLS interface).
LLS: Lower Layer Split: logical interface between O-DU and O-RU when using a lower layer (intra-PHY based) functional split.
M-Plane: Management Plane: refers to non-real-time management operations between the O-DU and the O-RU.
Node-B: 3GGP defined access function for 3G RAT.
O-CU: O-RAN Control Unit—a logical node hosting PDCP, RRC, SDAP and other control functions.
O-DU: O-RAN Distributed Unit: a logical node hosting RLC/MAC/High-PHY layers based on a lower layer functional split.
O-RU: O-RAN Radio Unit: a logical node hosting Low-PHY layer and RF processing based on a lower layer functional split. This is similar to 3GPP's "TRP" or "RRH" but more specific in including the Low-PHY layer (FFT/iFFT, PRACH extraction).
OTA: Over the Air.
S-Plane: Synchronization Plane: refers to traffic between the O-RU or O-DU to a synchronization controller which is generally an IEEE 1588 Grand Master (however, Grand Master functionality may be embedded in the O-DU).
U-Plane: User Plane: refers to IQ sample data transferred between O-DU and O-RU.
UL: UpLink: data flow away from the radiating antenna (generally on the LLS interface).

What is claimed is:

1. An open radio access network distributed unit (O-DU) comprising an electronic module that performs an FS-8 Radio Access Technology (RAT) functionality selected from the group consisting of:
   frequency hopping;
   downlink (DL) carrier aggregation;
   uplink (UL) channelization;
   power control; and
   fast automatic gain control (AGC);
   wherein the O-DU is adapted to provide,
      a joint UL component carrier channelizer;
      frequency hopping for 2G FS-8 RAT;
      power control and AGC for FS-8 RAT;
      sample rate conversation over an O-RAN compliant fronthaul carried IQ.

2. The O-DU of claim 1, further comprising a numerically controlled oscillator and a gain multiplication block for DL frequency hopping for 2G FS-8 RAT.

3. The O-DU of claim 1, further comprising:
   channelization stages for further processing in an UL direction to achieve multiple transmit-receive chain (TRX) via an antenna.

4. The O-DU of claim 3, wherein said antenna has component carriers from the FS-8 RAT.

5. The O-DU of claim 3, wherein said antenna has component carriers from different FS-8 RATs.

6. The O-DU of claim 1, adapted to map a 2G signal to a long-term evolution (LTE) bandwidth equivalent analog stream.

7. An open radio access network distributed unit (O-DU) comprising an electronic module that performs an FS-8 Radio Access Technology (RAT) functionality selected from the group consisting of:
- frequency hopping;
- downlink (DL) carrier aggregation;
- uplink (UL) channelization;
- power control; and
- fast automatic gain control (AGC); and
- a numerically controlled oscillator and a gain multiplication block for DL frequency hopping for 2G FS-8 RAT, wherein the O-DU is adapted to provide;
- a joint component carrier channelizer;
- frequency hopping for 2G FS-8 RAT;
- power control and AGC for FS-8 RAT; and
- sample rate conversions over an O-RAN compliant fronthaul carried IQ data.

8. The O-DU of claim 7, further comprising:
- channelization stages for further processing in an UL direction to achieve multiple transmit-receive chain (TRX) via an antenna.

9. The O-DU of claim 8, wherein said antenna has component carriers from an FS-8 RAT.

10. The O-DU of claim 8, wherein said antenna has component carriers from different FS-8 RATs.

11. The O-DU of claim 7, adapted to map a 2G signal to a long-term evolution (LTE) bandwidth equivalent analog stream.

12. An open radio access network distributed unit (O-DU) comprising an electronic module that performs an FS-8 Radio Access Technology (RAT) functionality selected from the group consisting of:
- frequency hopping;
- downlink (DL) carrier aggregation;
- uplink (UL) channelization;
- power control; and
- fast automatic gain control (AGC);
  - wherein the O-DU is adapted to use different radio frequency (RF) frequencies for each of a plurality of antennas to split a 2G bandwidth across said plurality of antennas in multiples of long-term evolution (LTE) equivalent bandwidths.

13. An open radio access network distributed unit (O-DU) comprising an electronic module that performs an FS-8 Radio Access Technology (RAT) functionality selected from the group consisting of:
- frequency hopping;
- downlink (DL) carrier aggregation;
- uplink (UL) channelization;
- power control; and
- fast automatic gain control (AGC); and
- a numerically controlled oscillator and a gain multiplication block for DL frequency hopping for 2G FS-8 RAT, wherein the O-DU is adapted to use different radio frequency (RF) frequencies for each of a plurality of antennas to split a 2G bandwidth across said plurality of antennas in multiples of long-term evolution (LTE) equivalent bandwidths.

\* \* \* \* \*